United States Patent
Yasmin et al.

(10) Patent No.: US 11,265,161 B2
(45) Date of Patent: Mar. 1, 2022

(54) SYSTEM AND METHOD FOR COMPUTING AN ESCROW SESSION KEY AND A PRIVATE SESSION KEY FOR ENCODING DIGITAL COMMUNICATIONS BETWEEN TWO DEVICES

(71) Applicant: Huawei International Pte. Ltd., Singapore (SG)

(72) Inventors: Rehana Yasmin, Singapore (SG); Yanjiang Yang, Singapore (SG); Zhuo Wei, Singapore (SG); Tieyan Li, Singapore (SG); Hai Yu, Shanghai (CN)

(73) Assignee: Huawei International Pte. Ltd., Singapore (SG)

(*) Notice: Subject to any disclaimer, the term of this patent is extended or adjusted under 35 U.S.C. 154(b) by 34 days.

(21) Appl. No.: 16/988,347

(22) Filed: Aug. 7, 2020

(65) Prior Publication Data

US 2020/0374116 A1     Nov. 26, 2020

Related U.S. Application Data

(63) Continuation of application No. PCT/SG2019/050072, filed on Feb. 8, 2019.

(30) Foreign Application Priority Data

Feb. 8, 2018 (SG) .......................... 10201801094V

(51) Int. Cl.
*H04L 9/08* (2006.01)
*G06Q 30/00* (2012.01)
*H04L 9/32* (2006.01)

(52) U.S. Cl.
CPC .......... *H04L 9/0897* (2013.01); *H04L 9/0841* (2013.01); *H04L 9/0847* (2013.01);
(Continued)

(58) Field of Classification Search
CPC ... H04L 9/0897; H04L 9/0841; H04L 9/0847; H04L 9/0866; H04L 9/3432;
(Continued)

(56) References Cited

U.S. PATENT DOCUMENTS 7,113,594 B2   9/2006  Boneh et al.
7,475,241 B2   1/2009  Patel et al.
(Continued)

OTHER PUBLICATIONS

Xiufeng Zhao, Qiuliang Xu and Hao Wang, "Provably secure identity-based key agreement protocols under simple assumption," 2010 IEEE International Conference on Information Theory and Information Security, 2010, pp. 506-509 [online][retrieved on Oct. 26, 2021]. Retrieved from IEEEXplore (Year: 2010).*

(Continued)

*Primary Examiner* — Jung W Kim
*Assistant Examiner* — Sangseok Park
(74) *Attorney, Agent, or Firm* — Leydig, Voit & Mayer, Ltd.

(57) ABSTRACT

This document describes a system and method for generating two types of session keys for encoding digital communications between two devices. In particular, the first type of session key possesses escrow properties whereby a trusted third party will be able to generate the first type of session key to decode the digital communications between the two devices while the second type of session key does not possess escrow properties.

15 Claims, 4 Drawing Sheets

(52) U.S. Cl.
CPC ....... *H04L 9/0866* (2013.01); *G06Q 30/0185* (2013.01); *H04L 9/3242* (2013.01)

(58) Field of Classification Search
CPC ..... H04L 9/0894; H04L 9/3073; H04L 9/321; G06Q 30/0185
See application file for complete search history.

(56) References Cited

U.S. PATENT DOCUMENTS

| | | |
|---|---|---|
| 9,485,091 B2 | 11/2016 | Arnold et al. |
| 2003/0012387 A1 | 1/2003 | Gilbert et al. |
| 2011/0093721 A1* | 4/2011 | Perlman ................ G06F 21/602 713/189 |

OTHER PUBLICATIONS

Zhao et al., "Provably Secure Identity-Based Key Agreement Protocols under Simple Assumption," 2010 IEEE International Conference on Information Theory and Information Security, XP031850536, pp. 506-509, Institute of Electrical and Electronics Engineers, New York, New York (2010).

Wang et al., "Provably Secure Identity-Based Authenticated Key Agreement Protocols Without Random Oracles," International Association for Cryptologic Research, XP061002189, total 16 pages (Sep. 5, 2007).

Cao et al., "Identity-Based Authenticated Key Agreement Protocols without Bilinear Pairings," IEICE Transactions on Fundamentals, vol. E91-A, No. 12, XP001519127, pp. 3833-3836 (Dec. 2008).

V. Cakulev et al., "IBAKE: Identity-Based Authenticated Key Exchange," Request for Comments 6539, pp. 1-13 (Mar. 2012).

Chen et al., "Identity-Based Key Agreement Protocols from Pairings," International Journal of Information Security, pp. 213-241, Springer-Verlag (2007).

Boyd et al., "Efficient One-Round Key Exchange in the Standard Model," ACISP 2008, LNCS 5107, Springer-Verlag Berlin Heidelberg, pp. 69-83 (2008).

Huang et al., "An ID-based Authenticated Key Exchange Protocol Based on Bilinear Diffie-Hellman Problem," Proceedings of ASIACCS 2009, ACM, total 10 pages (2009).

Ni et al., "Strongly secure identity-based authenticated key agreement protocols," Computers and Electrical Engineering, 37 (2011) pp. 205-217 (2011).

McCullagh et al., "A New Two-Party Identity-Based Authenticated Key Agreement," Cryptology ePrint Archive, Report 2004/122, http://eprint.iacr.org/2004/122, pp. 1-14 (2004).

Wang, "Efficient Identity-Based and Authenticated Key Agreement Protocol," Cryptology ePrint Archive, Report 2005/108, pp. 1-27 (2005).

Cheng et al., "Identity-Based Key Agreement with Unilateral Identity Privacy Using Pairings," ISPEC 2006, LNCS 3903, pp. 202-213, Springer-Verlag Berlin Heidelberg (2006).

Wang et al., "Perfect Forward Secure Identity-Based Authenticated Key Agreement Protocol in the Escrow Mode," Science in China Series F: Information Sciences, 52(8), total 17 pages (2009).

Shamir, "Identity-Based Cryptosystems and Signature Schemes," In Proc. Advances in Cryptology CRYPTO 1984, Lecture Notes in Computer Science, pp. 47-53 (1984).

Boneh et al., "Identity-Based Encryption from the Weil Pairing," Advances in Cryptology, CRYPTO 2001, pp. 213-229 (2001).

Cocks, "An Identity Based Encryption Scheme Based on Quadratic Residues," Proceedings of the 8th IMA International Conference on Cryptography and Coding, total 4 pages (2001).

\* cited by examiner

SYSTEM AND METHOD FOR COMPUTING AN ESCROW SESSION KEY AND A PRIVATE SESSION KEY FOR ENCODING DIGITAL COMMUNICATIONS BETWEEN TWO DEVICES

CROSS-REFERENCE TO RELATED APPLICATIONS

This application is a continuation of International Application No. PCT/SG2019/050072, filed on Feb. 8, 2019, which claims priority to Singapore Patent Application No. 10201801094V, filed on Feb. 8, 2018. The disclosures of the aforementioned applications are hereby incorporated by reference in their entireties.

TECHNICAL FIELD

This disclosure relates to a system and method for generating two types of session keys for encoding digital communications between two devices. In particular, the first type of session key possesses escrow properties whereby a trusted third party will be able to generate the first type of session key to decode the digital communications between the two devices while the second type of session key does not possess escrow properties.

BACKGROUND

Due to a convergence of multiple technologies, an ever increasing number of devices are now able to seamlessly communicate wirelessly with the Internet or wirelessly exchange communications between themselves. This convergence has resulted in the vision of the Internet of Things (IoT) gaining more traction through recent years. In the Internet of Things, millions of entities or devices (i.e., Things) will be connected to one another. These devices, which comprise devices or entities such as smart chips, smart plugs, smart watches, smart phones, smart vehicles, smart buildings, and etc., either communicate directly with one another or via the Internet.

As an example, it is becoming more commonplace that a vehicle's owner will have a mobile device that will exchange data with the vehicle on a daily basis. One purpose of this exchange is to integrate the car's data with the mobile device's data so that the collated data may be analyzed collectively. The analysed results are then used by an automaker and/or the vehicle's systems to ensure that the vehicle's performance, efficiency, and safety meet the required safety requirements. Data collected by the automakers may also be used to entice the vehicle's owner to sign up for more refined or customized services offered by the automaker or their partners.

In particular, when an automaker sells a vehicle to a new vehicle owner, the owner of the vehicle will typically agree to share data collected by the vehicle and/or data exchanged between the owner's mobile device and the vehicle. In return for providing the data to the automakers, automakers tend to offer several benefits/services to the car owner. For example, data collected in relation to one's driving behaviour may be used by automakers to provide tips to the driver to as to how he/she may become a smarter driver. Such data may also be shared with insurers who in turn may offer insurance discounts to various drivers based on their specific driving patterns and/or styles. Further, data obtained in relation to one's shopping venues, dining places and hotels etc. (i.e., data collected from the owner's mobile device), may be used by the vehicle's system to propose places of interest to the vehicle's owner as the owner is driving along a particular route or when the vehicle is parked at a particular location at a particular time. In addition to the vehicle system utilizing this data, this data may be shared and utilized by automakers and their partners, e.g. insurers etc, to send e-coupons to the owner's mobile device to entice the owner to frequent businesses along the route. Similarly, music data from the owner's mobile device may be utilized by the vehicle's system to arrange the driver's music list. As for data obtained in relation to the owner's phonebook (e.g., contacts list), this data may be utilized to allow calls and/or messages to be made directly from the vehicle system's interface rather than from the owner's mobile device.

In short, digital communications are transferred between the vehicle and the vehicle driver's mobile device on a daily basis. The type of data that is exchanged between these devices; and the direction it travels; vary from automaker to automaker, however, the usage of the data is almost consistently the same. Data (e.g., locations, navigations, driving behaviour etc.) will be transferred from the vehicle to the driver's mobile device because most automakers utilize mobile applications installed within a mobile device to collect the vehicle's data. The data is collected and then sent, sometimes together with the mobile device's data, to the automaker. In the other direction, data comprising the driver's health data, music list, phonebook, shopping, dining, navigation etc., may be transferred from driver's mobile device to the vehicle. Some of these data may be locally used by the vehicle's system only, e.g. driver's health data, music list, phonebook (e.g., contacts list) etc. and will not be shared with the automaker.

Hence, it can be said that in general, there are two types of data that are communicated between the vehicle's system and the vehicle owner's mobile device. The first type of data comprises data which may be shared with an automaker so that benefits/services may be offered to the car owner. For example, the first type of data may comprise locations, navigations, driving behaviour, shopping, dining places etc. The second type of data comprises the vehicle owner's private data which should only be accessible by the vehicle's system and the vehicle owner's mobile device only. This means that the second type of data should not be accessible to the automaker. The second type of data comprises data such as the driver's health data, exercise habits, personality, music lists, contacts list etc.

It is of utmost importance that data shared between the vehicle's system and the vehicle owner's mobile device be kept secure. These devices become more prone to cyber-attacks from hackers or unauthorized users as malicious wireless-enabled devices may be used to eavesdrop on the broadcasted communication to illegally obtain data. If unprotected, the data could be used to invade a user's privacy by disclosing his/her travel destinations, driving style, potential speeding, traffic violations etc. In a worst case scenario, the attack vector may expand to other devastating attacks, for instance, if the navigation data (usually containing home address) together with out-of-city destination data (indicating out of city trip) were to be obtained by a malicious party, this may result in a home burglary.

Therefore, strong confidentiality mechanisms, i.e. encryption schemes, are typically utilized to secure data that is being transmitted between two parties from being eavesdropped. An example of an encryption scheme that is utilized is Public Key Cryptography (PKC) (i.e., traditional public key infrastructure (PKI), identity based cryptography (IBC), etc.). In the PKC encryption techniques, data are encrypted using a public key and the encrypted data are subsequently decrypted using a corresponding private key. The downside of PKC based encryption technique is that this encryption technique is time and resource consuming, and is not suitable to be used in situations whereby data are encrypted/decrypted frequently.

Symmetric Key Cryptography (SKC) based encryption schemes are more efficient than PKC based encryption schemes. In SKC encryption schemes, a single unique key is shared between two communicating parties and this shared unique key is then used by both sides to encrypt and decrypt data, i.e. a shared session key is required to securely establish a session between both communicating parties. The establishment of the common secret key is one of the fundamental techniques required for secure communication between two parties employing the SKC scheme. Ideally, a different shared secret key will be established for each communication session between two entities and this shared secret key is known in the art as a session key. One way to establish a shared session key is to use long term private keys associated with the PKC scheme for session key establishment and then utilize the established session key for frequent encryption/decryption processes.

In some cases, certain vehicle owners may behave maliciously and may refuse to share data which they had previously agreed to share. To do so, vehicle owners may change their mobile device's or their vehicle system's configuration to block or manipulate data that is being transmitted to the automaker. If data exchanged between the vehicle's system and the mobile device is simply encrypted using PKI or the SKC scheme, the automaker may not obtain data of badly behaving drivers. Therefore, there is a need in the art for a method to secure data in a selective manner. In other words, the securing method should be able to distinguish the type of data that is to be secured and secure the data accordingly. For example, the automaker should be able to access any of the vehicle owner's data that is to be shared with the automaker even if this data is protected; while the vehicle owner's private data should be kept private and accessible by the vehicle owner's only (in the vehicle and mobile device) and should not be accessible by the automaker.

A common approach for establishing session keys between two parties involves the establishment of a session key without key escrow or a session key with key escrow for encryption/decryption. If the session key established between a vehicle and a mobile device is unknown to automaker (without key escrow), the automaker would not be able to decode the data exchanged between the vehicle and the mobile device. This is problematic as this data was preagreed to be shared with the automaker. On the other hand, if the session key was made known to the automaker (with key escrow), the automaker will be able to access the vehicle owner's private data as well.

For the above reasons, those skilled in the art are constantly striving to come up with a system and method for securely transferring data between a vehicle and the vehicle owner's mobile device with the objective of distinguishing the types of data being secured and exchanged by establishing different session keys for each type of data.

SUMMARY

The above and other problems are solved and an advance in the art is made by systems and methods provided by embodiments in accordance with the disclosure.

A first advantage of embodiments of systems and methods in accordance with the disclosure is that the system simultaneously allows two types of session keys to be generated, a session key with escrow and a private session key (without escrow) whereby data secured using the session key with escrow may be decoded by a trusted third party while data secured using the private session key (without escrow) may only be accessed by the two parties who are exchanging the data.

A second advantage of embodiments of systems and methods in accordance with the disclosure is that the system and method for establishing the two types of session keys are efficient as these two keys may be established in one protocol run by manipulating the same exchanged parameters in different ways.

A third advantage of embodiments of systems and methods in accordance with the disclosure is that parties to the communication are authenticated implicitly in one key confirmation protocol thereby simplifying the communication process.

The above advantages are provided by embodiments of a method in accordance with the disclosure operating in the following manner.

According to a first aspect of the disclosure, a system for generating an escrow session key $SK_1$ and a private session key $SK_2$ for encoding digital communications between a device i and an another device j, comprising: a secure server configured to: generate a master secret key (MSK) and global system parameters (GSP) for an Identity Based Cryptography (IBC) scheme, whereby the MSK and GSP are utilized together with a requesting device's identity to generate an IBC private key IBC-K for the requesting device; the device i, being configured to: use an Identity Based Encryption (IBE) scheme associated with the IBC scheme to encrypt a first element $g^a$ with an identity $ID_j$, associated with the another device j, where g is a generator of a cyclic multiplicative group G and a is a random number generated by the device i; communicate to the another device j, the encrypted first element, an identity $ID_i$ associated with the device i and a session key request such that upon receiving the communication, the another device j is configured to: use the IBE scheme to decrypt the encrypted first element with an IBC private key, IBC-$K_j$, whereby the private key, IBC-$K_j$, is requested and obtained from the secure server; generate a second element $g^b$ where g is the generator of the cyclic multiplicative group G and b is a random number generated by the another device j; compute the escrow session key $SK_1$, using the first element; compute the private session key $SK_2$, using the first element and the random number b; and communicate the second element and an identity $ID_j$ associated with the another device j to the device i, compute the escrow session key $SK_1$, using the first element; compute the private session key $SK_2$, using the second element and the random number a.

With reference to the first aspect, the system further comprises the device i, being configured to: compute a first combined key $SK_{11}$ by obtaining a coproduct of $SK_1$ and $SK_2$; generate a key confirmation value using the first combined key $SK_{11}$ whereby the key confirmation value is communicated to the another device j, such that upon receiving the key confirmation value, the another device j is configured to: compute a second combined key $SK_{22}$ by obtaining a coproduct of $SK_1$ and $SK_2$; and verify the received key confirmation value using the second combined key $SK_{22}$ and validate the escrow session key $SK_1$ and the private session key $SK_2$ if the received key confirmation value is verified.

With reference to the first aspect, whereby the another device j being configured to communicate the second element and the identity $ID_j$ associated with the another device j to the device i further comprises the another device j being configured to: use the IBE scheme to encrypt the second element with an identity $ID_i$ associated with the device i, communicate the encrypted second element and the identity $ID_j$ associated with the another device j to the device i such that upon receiving the communication, the device i is configured to: use the IBE scheme to decrypt the encrypted second element with an IBC private key, IBC-$K_i$, whereby the private key, IBC-$K_i$, is requested and obtained from the secure server by the device i.

With reference to the first aspect, wherein the computing the escrow session key $SK_1$ by the another device j comprises the another device j being configured to use the first element and the second element to generate the escrow session key $SK_1$ and the computing the escrow session key $SK_1$ by the device i comprises the device i being configured to use the first element and the second element to generate the escrow session key $SK_1$.

With reference to the first aspect, wherein the another device j being configured to communicate the second element and the identity $ID_j$ associated with the another device j to the device i further comprises the another device j being configured to: use a Public Key Infrastructure (PKI) scheme to encrypt the second element with a PKI Public Key $PBK_i$, associated with the device i, communicate the encrypted second element and the identity $ID_j$ associated with the another device j to the device i such that upon receiving the communication, the device i is configured to: use the PKI scheme to decrypt the encrypted second element with a PKI Private Key, $PRK_i$, associated with the device i.

With reference to the first aspect, wherein the step of, communicating the encrypted first element, the identity $ID_i$ associated with the device i and the session key request to the another device j by the device i further comprises the device i being configured to: sign the encrypted first element using an IBC private signing key IBC-$K_i$ associated with the device i and in place of the encrypted first element, transmit the signed encrypted first element to the another device j such that upon receiving the communication, the another device j is configured to: verify the signed encrypted first element using the identity $ID_i$ associated with the device i and a verification function associated with the IBC scheme, whereby the first element is decrypted if the signed encrypted first element is verified.

According to a second aspect of the disclosure, a method for generating an escrow session key $SK_1$ and a private session key $SK_2$ for encoding digital communications between a device i and an another device j is disclosed, the method comprising: generating, by a secure server, a master secret key (MSK) and global system parameters (GSP) for an Identity Based Cryptography (IBC) scheme, whereby the MSK and GSP are utilized together with a requesting device's identity to generate an IBC private key IBC-K for the requesting device; encrypting, by the device i, a first element $g^a$ with an identity $ID_j$, associated with the another device j, using an Identity Based Encryption (IBE) scheme associated with the IBC scheme, where g is a generator of a cyclic multiplicative group G and a is a random number generated by the device i; communicating, by the device i, to the another device j, the encrypted first element, an identity $ID_i$ associated with the device i and a session key request such that upon receiving the communication, the another device j is configured to: use the IBE scheme to decrypt the encrypted first element with an IBC private key, IBC-$K_j$, whereby the private key, IBC-$K_j$, is requested and obtained from the secure server; generate a second element $g^b$ where g is the generator of the cyclic multiplicative group G and b is a random number generated by the another device j; compute the escrow session key $SK_1$, using the first element; compute the private session key $SK_2$, using the first element and the random number b; and communicate the second element and an identity $ID_j$ associated with the another device j to the device i, computing, by the device i, the escrow session key $SK_1$, using the first element, and computing the private session key $SK_2$, using the second element and the random number a.

With reference to the second aspect, the method further comprises the steps of: computing, by the device i, a first combined key $SK_{11}$ by obtaining a coproduct of $SK_1$ and $SK_2$; generating a key confirmation value using the first combined key $SK_{11}$ whereby the key confirmation value is communicated to the another device j, such that upon receiving the key confirmation value, the another device j is configured to: compute a second combined key $SK_{22}$ by obtaining a coproduct of $SK_1$ and $SK_2$; and verify the received key confirmation value using the second combined key $SK_{22}$ and validate the escrow session key $SK_1$ and the private session key $SK_2$ if the received key confirmation value is verified.

With reference to the second aspect, wherein the step of the another device j being configured to communicate the second element and the identity $ID_j$ associated with the another device j to the device i further comprises the step of: using, by the another device j, the IBE scheme to encrypt the second element with an identity $ID_i$ associated with the device i, communicating the encrypted second element and the identity $ID_j$ associated with the another device j to the device i such that upon receiving the communication, the device i is configured to: use the IBE scheme to decrypt the encrypted second element with an IBC private key, IBC-$K_i$, whereby the IBC private key, IBC-$K_i$, is requested and obtained from the secure server by the device i.

With reference to the second aspect, the step of computing the escrow session key $SK_1$ by the another device j comprises the step of the another device j being configured to use the first element and the second element to generate the escrow session key $SK_1$ and the computing the escrow session key $SK_1$ by the device i comprises the step of the device i being configured to use the first element and the second element to generate the escrow session key $SK_1$.

With reference to the second aspect, wherein the step of the another device j being configured to communicate the second element and the identity $ID_j$ associated with the another device j to the device i further comprises the step of: using, by the another device j, a Public Key Infrastructure (PKI) scheme to encrypt the second element with a PKI Public Key $PBK_i$, associated with the device i, communicating the encrypted second element and the identity $ID_j$ associated with the another device j to the device i such that upon receiving the communication, the device i is configured to: use the PKI scheme to decrypt the encrypted second element with a PKI Private Key, $PRK_i$, associated with the device i.

With reference to the second aspect, wherein the step of, communicating the encrypted first element, the identity $ID_i$ associated with the device i and the session key request to the another device j by the device i further comprises the step of: signing, by the device i, the encrypted first element using an IBC private signing key IBC-$K_i$ associated with the device i and in place of the encrypted first element, transmit the signed encrypted first element to the another device j such that upon receiving the communication, the another device j is configured to: verifying the signed encrypted first element using the identity $ID_i$ associated with the device i and a verification function associated with the IBC scheme, whereby the first element is decrypted if the signed encrypted first element is verified.

According to a third aspect of the disclosure, a device i for generating an escrow session key $SK_1$ and a private session key $SK_2$ for encoding digital communications between the device i and another device j, is disclosed, the device comprising: a processor; and a non-transitory media readable by the processor, the non-transitory media storing instructions that when executed by the processor, cause the processor to: use an Identity Based Encryption (IBE) scheme associated with an Identity Based Cryptography (IBC) scheme to encrypt a first element $g^a$ with an identity $ID_j$, associated with the another device j, where g is a generator of a cyclic multiplicative group G and a is a random number generated by the device i, wherein the IBC scheme comprises a master secret key (MSK) and global system parameters (GSP), whereby the MSK and GSP are utilized together with a requesting device's identity to generate an IBC private key IBC-K for the requesting device; communicate to the another device j, the encrypted first element, an identity $ID_i$ associated with the device i and a session key request; receive a second element $g^b$ and an identity $ID_j$ associated with the another device j, compute the escrow session key $SK_1$, using the first element; compute the private session key $SK_2$, using the second element $g^b$ and the random number a, where g is the generator of the cyclic multiplicative group G and b is a random number generated by the another device j.

With reference to the third aspect, the device i, is being configured to: compute a first combined key $SK_{11}$ by obtaining a coproduct of $SK_1$ and $SK_2$; generate a key confirmation value using the first combined key $SK_{11}$ whereby the key confirmation value is communicated to the another device j; and validate the key confirmation value if a key confirmation validation value associated with the another device j is received.

With reference to the third aspect, the received second element $g^b$ is encrypted using the IBE scheme and an identity $ID_i$ associated with the device i, whereby the device uses the IBE scheme to decrypt the encrypted second element with an IBC private key, IBC-$K_i$, whereby the private key, IBC-$K_i$, is requested and generated in accordance with the IBC scheme.

With reference to the third aspect, the computing the escrow session key $SK_1$ by the device i comprises the device i being configured to use the first element and the second element to generate the escrow session key $SK_1$.

With reference to the third aspect, the received second element $g^b$ is encrypted using a Public Key Infrastructure (PKI) scheme with a PKI Public Key $PBK_i$, associated with the device i, whereby the device uses the PKI scheme to decrypt the encrypted second element with a PKI Private Key, $PRK_i$, associated with the device i.

With reference to the third aspect, the step of communicating the encrypted first element, the identity $ID_i$ associated with the device i and the session key request to the another device j by the device further comprises the device i being configured to: sign the encrypted first element using an IBC private signing key IBC-$K_i$ associated with the device i and in place of the encrypted first element, transmit the signed encrypted first element to the another device j.

According to a fourth aspect of the disclosure, a method for generating an escrow session key $SK_1$ and a private session key $SK_2$ for encoding digital communications between a device i and another device j, is disclosed, the method comprising: encrypting, by the device i, a first element $g^a$ with an identity $ID_j$, associated with the another device j, using an Identity Based Encryption (IBE) scheme associated with an Identity Based Cryptography (IBC) scheme, where g is a generator of a cyclic multiplicative group G and a is a random number generated by the device i, wherein the IBC scheme comprises a master secret key (MSK) and global system parameters (GSP), whereby the MSK and GSP are utilized together with a requesting device's identity to generate an IBC private key IBC-K for the requesting device; communicating, by the device i, to the another device j, the encrypted first element, an identity $ID_i$ associated with the device i and a session key request, receive the second element and an identity $ID_j$ associated with the another device j; computing, by the device i, the escrow session key $SK_1$, using the first element, and computing the private session key $SK_2$, using the second element and the random number a.

With reference to the fourth aspect, the method further comprises the steps of: computing a first combined key $SK_{11}$ by obtaining a coproduct of $SK_1$ and $SK_2$; generating a key confirmation value using the first combined key $SK_{11}$ whereby the key confirmation value is communicated to the another device j; and validating the key confirmation value if a key confirmation validation value associated with the another device j is received.\

With reference to the fourth aspect, the received second element $g^b$ is encrypted using the IBE scheme and an identity $ID_i$ associated with the device i, whereby the device uses the IBE scheme to decrypt the encrypted second element with an IBC private key, IBC-$K_i$, whereby the private key, IBC-$K_i$, is requested and generated in accordance with the IBC scheme.

With reference to the fourth aspect, the received second element $g^b$ is encrypted using the IBE scheme and an identity $ID_i$ associated with the device i, whereby the device uses the IBE scheme to decrypt the encrypted second element with an IBC private key, IBC-$K_i$, whereby the private key, IBC-$K_i$, is requested and generated in accordance with the IBC scheme.

With reference to the fourth aspect, the received second element $g^b$ is encrypted using a Public Key Infrastructure (PKI) scheme with a PKI Public Key $PBK_i$, associated with the device i, whereby the device uses the PKI scheme to decrypt the encrypted second element with a PKI Private Key, $PRK_i$, associated with the device i.

With reference to the fourth aspect, the step of communicating the encrypted first element, the identity $ID_i$ associated with the device i and the session key request to the another device j by the device i further comprises the step of: signing, by the device i, the encrypted first element using an IBC private signing key IBC-$K_i$ associated with the device i and in place of the encrypted first element, transmit the signed encrypted first element to the another device j.

BRIEF DESCRIPTION OF DRAWINGS

The above advantages and features in accordance with this disclosure are described in the following detailed description and are shown in the following drawings.

DESCRIPTION OF EMBODIMENTS

This disclosure relates to a system and method for generating two types of session keys for encoding digital communications between two devices. In particular, the first type of session key possesses escrow properties whereby a trusted third party will be able to generate the first type of session key to decode the digital communications between the two devices while the second type of session key does not possess escrow properties. This means that communications secured using the second type of session key may only be accessed by either one of the two devices and not by any trusted third party.

Figure 1:
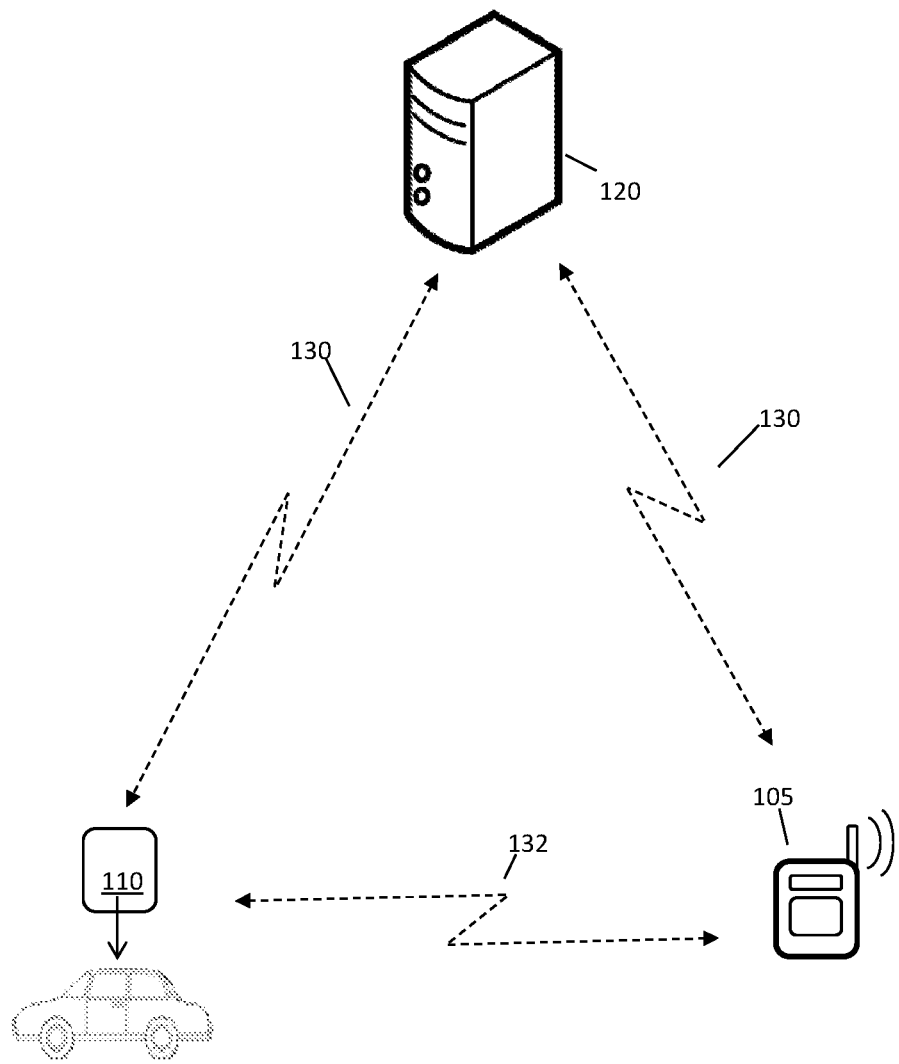
FIG. 1 illustrating a block diagram representative of a system for generating an escrow session key and a private session key for encoding digital communications between two devices in accordance with embodiments of the disclosure.

FIG. 1 illustrates a block diagram of a system for generating an escrow session key $SK_1$ and a private session key $SK_2$ for encoding digital communications between two devices in accordance with embodiments of the disclosure. The system illustrated in FIG. 1 comprises devices 105 and 110 that are communicatively connected to each other and also to secure server 120. Entities 105 and 110 each may comprise, but is not limited to, any device that is able to carry out wireless communicative functions such as a mobile computing device, a smart phone, a tablet computer, a mobile computer, a netbook, a wearable electronic device such as smart watch, smart plugs, or transceivers that may be found in smart devices, communication devices or Internet of Things (IoT) enabled devices, and etc. One skilled in the art will recognize that one, or more than one of devices 105 and 110 may be integrated within other modules such as within the Electronic Control Units (ECUs) of vehicles without departing from this disclosure.

As for secure server 120, this server may comprise a third party that is trusted by devices 105 and/or 110. Server 120 may comprise a secure cloud server or a remotely located secure server which is able to communicate wirelessly with entities 105 and 110 either indirectly through the Internet or through other forms of direct communication means with entities 105 and 110. If server 120 is configured to communicate with entities 105 and 110 through the Internet, server 120 may do so via wired networks or wireless networks 130 such as, but are not limited to, cellular networks, satellite networks, telecommunication networks, or Wide Area Networks (WANs). Alternatively, if server 120 is configured to communicate directly with entities 105 and 110, this may be accomplished through wireless networks 132 such as, but not limited to, Wireless-Fidelity (Wi-Fi), Bluetooth, or Near Field Communication (NFC). It should be noted that entities 105 and 110 may utilize either one of wireless network 130 (via the Internet) or wireless network 132 (direct communication) to exchange data messages with one another.

Figure 2:
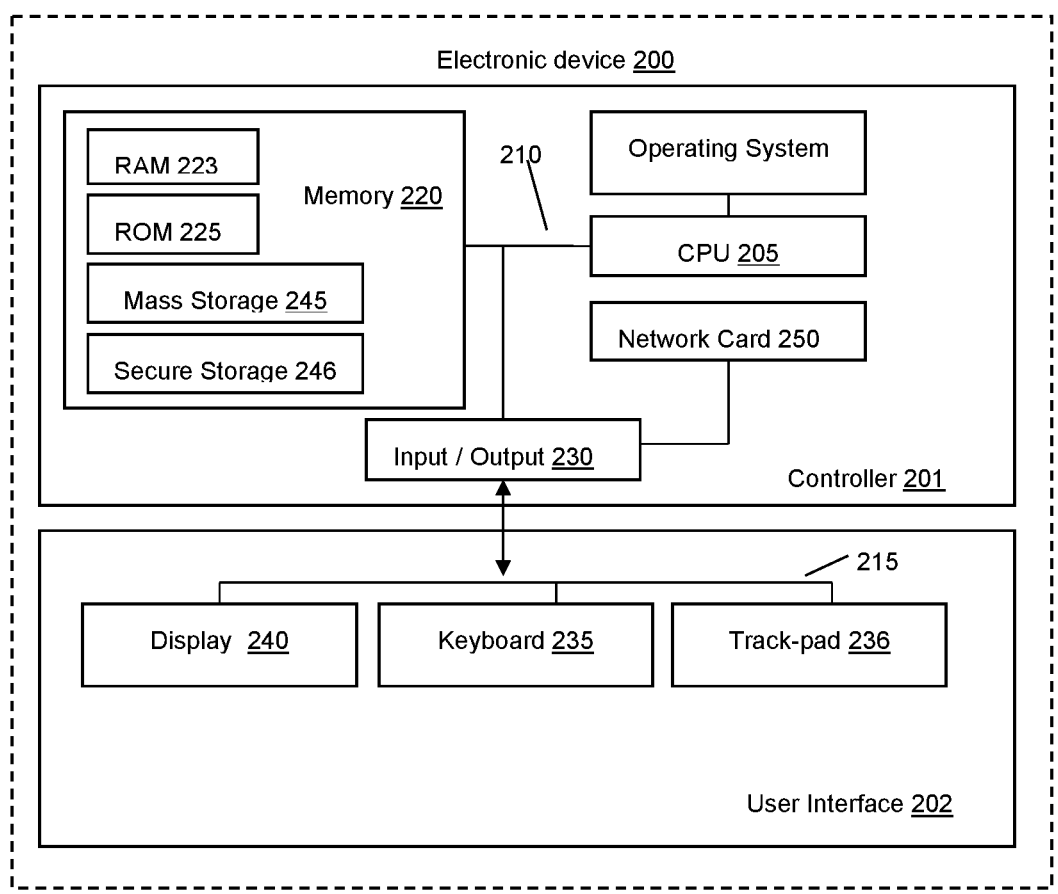
FIG. 2 illustrating a block diagram representative of components in an electronic device or server for implementing embodiments in accordance with embodiments of the disclosure.

FIG. 2 illustrates a block diagram representative of components of an electronic device 200 that is provided within entities 105, 110 and server 120 for implementing embodiments in accordance with embodiments of the disclosure. One skilled in the art will recognize that the exact configuration of each electronic device provided within the entities or the server may be different and the exact configuration of electronic device 200 may vary and FIG. 2 is provided by way of example only.

In embodiments of the disclosure, device 200 comprises controller 201 and user interface 202. User interface 202 is arranged to enable manual interactions between a user and electronic device 200 and for this purpose includes the input/output components required for the user to enter instructions to control electronic device 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, Central Processing Unit (CPU) 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WANs) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. It should be noted that the contents within secure storage 246 are only accessible by a super-user or administrator of device 200 and may not be accessed by any user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Referring back to FIG. 1, prior to the initiation of secure communication between devices 105 and 110, in accordance with embodiments of the disclosure, server 120, which is treated as a trusted third party, will initially be configured as a Key Generation Centre. Server 120 will first initiate a setup procedure for Identity Based Cryptography (IBC) schemes to generate a master secret key msk and global system parameters (GSP) including its master public key mpk. The generation of the master secret msk and the global system parameters are omitted for brevity as the generation of these variables are known to those skilled in the art.

Server 120 may also select a Key Deriving Function (KDF) that is to be adopted for use in the system by any of devices 105 and/or 110. In embodiments of the disclosure, the KDF may include any scheme for deriving a secret key from a secret value such as a collision-resistant hash function. An example of a cryptographic collision-resistant hash function that may be employed is H: $\{0,1\}^* \rightarrow \{0,1\}^\lambda$, whereby $\lambda$ is an appropriate integer known to a person skilled in the art.

When device 105 or 110 joins the system, an IBC private key unique to each of these devices may be issued by secure server 120. These unique IBC private keys once generated may then be communicated to each of these devices whereby the respective IBC private keys may then be stored in the secure memory within each of devices 105 and 110.

In particular, when device 105 registers itself with server 120, device 105 will communicate its identity $ID_{105}$ to server 120. The identity $ID_{105}$ of device 105 may comprise its user name, email address, telephone number, IP address, MAC address, or any alphanumeric combination that may be utilized to uniquely identify device 105. Server 120 then uses the identity $id_{105}$ associated with device 105 with a key generation algorithm to generate an IBC private key IBC-$K_{105}$ for device 105. In embodiments of the disclosure, device 105 may choose not to obtain its IBC private key hence it does not need to register itself with server 120. Instead, device 105 may choose to adopt a Public Key Infrastructure (PKI) scheme as such; device 105 will preload its PKI public key and its PKI private key into its secure memory.

As for device 110, when device 110 registers itself with server 120, device 110 will then transmit its identity $ID_{110}$ to server 120. In embodiments of the disclosure, identity $ID_{110}$ may comprise, but is not limited to, the vehicle's license plate number, a driver's license number, the vehicle's Vehicle Identification Number (VIN) as the VIN contains various details about a vehicle including its manufacturer, model, year, where it was manufactured or any alphanumeric combination that may be utilized to uniquely identify device 110. Server 120 then uses identity $ID_{110}$ associated with device 110 with the same key generation algorithm to generate an IBC private key IBC-$K_{110}$ for device 110. In embodiments of the disclosure, the IBC private keys IBC-K for each device may be generated using standard Key Generation functions associated with IBC schemes.

The IBC private keys IBC-$K_{105}$ (if requested) and IBC-$K_{110}$ are then communicated securely to their respective devices. Once the IBC private keys have been stored in the secure memory of the respective devices, the device pair, i.e. device 105 and 110, may then proceed to generate an escrow session key $SK_1$ and a private session key $SK_2$ for encoding digital communication between these two devices. In the following description, for ease of reading, device 105 may also be identified as device "i" while device 110 may also be identified as device "j". In embodiments of the disclosure, instead of requesting for its own IBC private key, device 105 will utilize a PKI scheme as such; device 105 will preload its PKI public key and its PKI private key into its secure memory.

It is useful to note that IBC schemes that may be employed in embodiments of the disclosure include, but are not limited to, the Boneh-Franklin scheme.

Embodiment Based on Both Devices Having IBC Private Keys (Decryption Key), IBC-K In a first embodiment of the disclosure, devices 105 and 110 will both initially request and obtain their respective IBC private keys from server 120 whereby both of these IBC private keys will act as an Identity Based Encryption (IBE) scheme's decryption keys. The IBC private keys are then stored in each respective device's secure memory.

Figure 3:
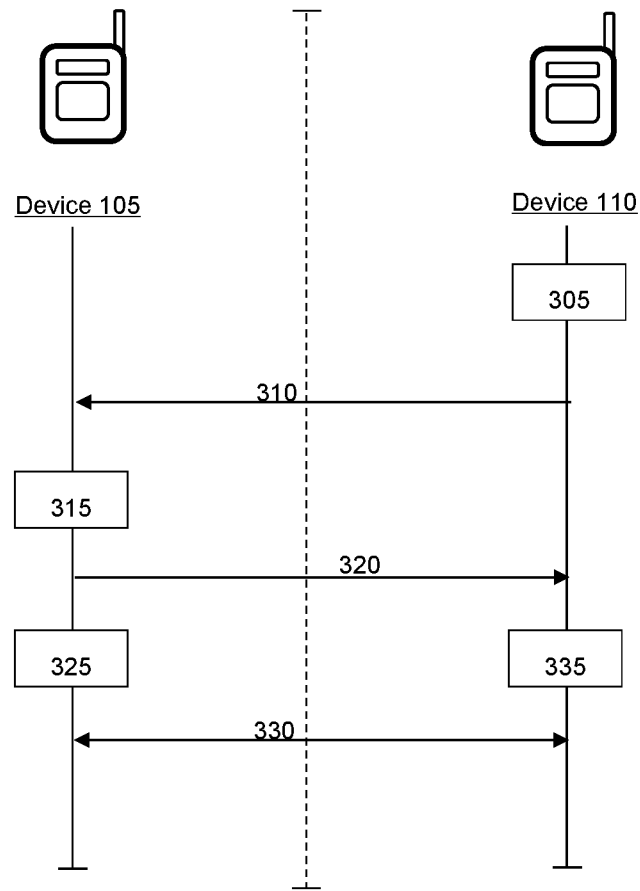
FIG. 3 illustrating a timing diagram for the generation of an escrow session key and a private session key for encoding digital communications between two devices in accordance with embodiments of the disclosure.

The generation of the escrow and private session keys for devices 105 and 110 in accordance with this embodiment of the disclosure is illustrated in FIG. 3. In particular, at step 305, device 105 initiates the process by choosing a random number "a". Device 105 then proceeds to compute a first element $g^a$ using the chosen random number "a" where g is a generator of a cyclic multiplicative group G with prime order q.

The detailed computation of the first element $g^a$ is omitted for brevity as this computation is done using existing Diffie-Hellman key exchange methodologies. For example, in a Diffie-Hellman key exchange between two users A and B, A will first select a random number "a", and B will first select a random number "b". Parameters $g^a$, $g^b$ are then exchanged between them. A then computes $(g^b)^a$ using its "a" parameter and B computes $(g^a)^b$ with its "b" parameter. As a result, A and B are then able to establish a common secret CommonSecret=$g^{ab}$. In other words, given only $g^a$ and $g^b$, no other third party would be able to compute $g^{ab}$.

Returning to step 305, device 105 will then encrypt the first element $g^a$ using the identity of device 110, $ID_{110}$. This may be done using an Identity Based Encryption (IBE) function associated with the IBC scheme and this may be represented as $\theta = Enc_{ID110}(g^a, ID_{105})$. The encrypted first element $\theta$, the identity of device 105, $ID_{105}$ and a session key request are then transmitted at step 310 from device 105 to device 110.

Upon receiving the data transmitted from device 105 at step 315, device 110 then proceeds to decrypt the encrypted first element $\theta$. This decryption step may be done using a decryption function associated with the IBC encryption scheme whereby device 110's IBC private key, IBC-$K_{110}$ is used to decrypt encrypted first element $\theta$ that was previously encrypted using device 110's identity $ID_{110}$ with an IBC encryption scheme. Once the encrypted first element $\theta$ has been decrypted, device 110 will now be in possession of the first element $g^a$.

Device 110 then proceeds to choose a random number "b". Device 110 then proceeds to compute a second element $g^b$ using the chosen random number "b" where g is a generator of a cyclic multiplicative group G with prime order q.

Device 110 will then encrypt the second element $g^b$ using the identity of device 105, $ID_{105}$. This may again be done using an Identity Based Encryption (IBE) function associated with the IBC scheme and this may be represented as $\epsilon 32$ $Enc_{ID105}(g^b, ID_{110})$. The encrypted second element $\epsilon$ and the identity of device 110, $ID_{110}$ are then transmitted at step 320 from device 110 to device 105.

At step 325, after the data has been transmitted to device 105 from device 110, device 110 then proceeds to compute the escrow session key $SK_1$ using the first element $g^a$ and the second element $g^b$. The computation of the escrow session key $SK_1$ above may be done using existing key generation functions and these two parameters. Separately, the private session key $SK_2$ is then computed using a function of the first element $g^a$ and random number "b", i.e. $g^{ab}$ whereby random number "b" is known only to device 110.

Once device 105 has received the data transmitted from device 110 at step 320, at step 335, device 105 then proceeds to decrypt the encrypted second element $\epsilon$. This decryption step may be done using a decryption function associated with the IBC scheme whereby device 105's IBC private key, IBC-$K_{105}$ is used to decrypt the encrypted second element $\epsilon$ that was previously encrypted using device 105's identity $ID_{105}$ with an IBC encryption scheme. Once the encrypted second element $\epsilon$ has been decrypted, device 105 will now be in possession of the second element $g^b$.

Device 105 then proceeds to compute the escrow session key $SK_1$ using the first element $g^a$ and the second element $g^b$. Similarly, the computation of the escrow session key $SK_1$ above may be done using existing key generation functions and these two parameters. Separately, the private session key $SK_2$ is then computed using a function of the first element $g^b$ and random number "a", i.e. $g^{ab}$ whereby random number "a" is known only to device 105.

In embodiments of the disclosure, steps 325 and 335 may take place simultaneously or in other embodiments of the disclosure, step 325 may take place before the data is transmitted at step 320 to device 105.

Once devices 105 and 110 have generated their respective escrow session keys $SK_1$ and private session keys $SK_2$, the validity of these two keys are verified by obtaining a coproduct of these two keys. The coproduct obtained by device 105 may be defined as $SK_{105}=SK_1 \oplus SK_2$ while the coproduct obtained by device 110 may be defined as $SK_{110}=SK_1 \oplus SK_2$. In embodiments of the disclosure, the coproduct obtained by device 105 may be defined as combined key $SK_{105}$ while the coproduct obtained by device 110 may be defined as combined key $SK_{110}$.

In a further embodiment of the disclosure, once device 105 has computed its coproduct $SK_{105}$ and once device 110 has computed its own coproduct $SK_{110}$, these two devices may then perform a series of steps to confirm that their respectively generated escrow session key $SK_1$ and private session key $SK_2$ are similar. In an embodiment of the disclosure, this may be achieved by encrypting a preagreed challenge phrase using device 105's coproduct $SK_{105}$. This encrypted challenge phrase is then sent to device 110. Device 110 will then decrypt the encrypted challenge phrase using its own coproduct $SK_{110}$. If the decrypted challenge phrase matches the challenge phrase stored in device 110, this implies that both coproducts are similar. In yet another embodiment of the disclosure, device 105's coproduct $SK_{105}$ may be used with a message authentication code (MAC) algorithm to produce a MAC data tag. This data tag may then be sent to device 110 who will then in turn use its coproduct $SK_{110}$ to verify the data tag. If the data tag is verified, this then implies that both coproducts are similar. In still yet another embodiment of the disclosure, device 105's coproduct $SK_{105}$ may be used to generate a hash of a preagreed verification value. This hash is then forwarded to device 110. Device 110 then uses its own coproduct $SK_{110}$ to generate a hash of the preagreed verification value. If the two hash values match, this then implies that the coproducts of both devices are similar.

Hence, as server 120 was the trusted source that generated the IBC private keys for devices 105 and 110, server 120 would be able to decrypt the encrypted first element $\theta$ and the encrypted second element $\epsilon$ thereby allowing server 120 to compute the escrow session key $SK_1$ on its own. However, as server 120 is unaware of the random number "a" generated by device 105 and the random number "b" generated by device 110, server 120 is unable to compute the private session key $SK_2$ thereby ensuring that all communication secured using this private session key remains private to devices 105 and 110 only.

Embodiment Based on a Device Having an IBC Private Key (Decryption Key), IBC-K and Another Device Having a PKI Private Key (Decryption Key) and a PKI Public Key In a second embodiment of the disclosure, only device 110 will initially request and obtain its IBC private key from server 120 and this key will act as the decryption key in accordance with embodiments of the disclosure. The IBC private key is then stored in device 110's secure memory. As for device 105, device 105 utilizes a Public Key Infrastructure (PKI) scheme as such; device 105 will preload its PKI public key $PBK_{105}$ and its PKI private key $PRK_{105}$ into its secure memory. In accordance with the PKI scheme, device 105's PKI public key $PBK_{105}$ is known to the public and in particular known to device 110.

The generation of the escrow and private session keys for devices 105 and 110 in accordance with this embodiment of the disclosure is described with the assistance of the illustration in FIG. 3. In particular, at step 305, device 105 initiates the process by choosing a random number "a". Device 105 then proceeds to compute a first element $g^a$ using the chosen random number "a" where g is a generator of a cyclic multiplicative group G with prime order q. Device 105 will then encrypt the first element $g^a$ using the identity of device 110, $ID_{110}$. This may be done using an Identity Based Encryption (IBE) function associated with the IBC scheme and this may be represented as $\theta=Enc_{ID110}(g^a, ID_{105})$. The encrypted first element $\theta$, the identity of device 105, $ID_{105}$ and a session key request are then transmitted at step 310 from device 105 to device 110.

Upon receiving the data transmitted from device 105 at step 315, device 110 then proceeds to decrypt the encrypted first element $\theta$. This decryption step may be done using a decryption function associated with the IBC encryption scheme whereby device 110's IBC private key, IBC-$K_{110}$ is used to decrypt encrypted first element $\theta$ that was previously encrypted using device 110's identity $ID_{110}$ with an IBC encryption scheme. Once the encrypted first element $\theta$ has been decrypted, device 110 will now be in possession of the first element $g^a$.

Device 110 then proceeds to choose a random number "b". Device 110 then proceeds to compute a second element $g^b$ using the chosen random number "b" where g is a generator of a cyclic multiplicative group G with prime order q.

Device 110 will then encrypt the second element $g^b$ using the public PKI key of device 105, which is $PBK_{105}$. This may be done using a PKI encryption function that is known to those skilled in the art and this may be represented as $\epsilon=Enc_{PBK105}(g^b, ID_{110})$. The encrypted second element $\epsilon$ and the identity of device 110, $ID_{110}$ are then transmitted at step 320 from device 110 to device 105.

At step 325, after the data has been transmitted to device 105 from device 110, device 110 then proceeds to compute the escrow session key $SK_1$ using only the first element $g^a$. The computation of the escrow session key $SK_1$ above may be done using existing key generation functions and the first element. Separately, the private session key $SK_2$ is then computed using a function of the first element $g^a$ and random number "b", i.e. $g^{ab}$ whereby random number "b" is known only to device 110.

Once device 105 has received the data transmitted from device 110 at step 320, at step 335, device 105 then proceeds to decrypt the encrypted second element $\epsilon$. This decryption step may be done using a decryption function associated with the PKI scheme whereby device 105's private PKI key, $PRK_{105}$ is used to decrypt the encrypted second element ϵ that was previously encrypted using device 105's public PKI key, $PBK_{105}$. Once the encrypted second element ϵ has been decrypted, device 105 will now be in possession of the second element $g^b$.

Device 105 then proceeds to compute the escrow session key $SK_1$ using only the first element $g^a$. Similarly, the computation of the escrow session key $SK_1$ above may be done using existing key generation functions and the first element. Separately, the private session key $SK_2$ is then computed using a function of the first element $g^b$ and random number "a", i.e. $g^{ab}$ whereby random number "a" is known only to device 105.

As per the previous embodiments, one skilled in the art will recognize that steps 325 and 335 may take place simultaneously or in other embodiments of the disclosure, step 325 may take place before the data is transmitted at step 320 to device 105.

Once devices 105 and 110 have generated their respective escrow session keys $SK_1$ and private session keys $SK_2$, the validity of these two keys may be verified by obtaining a coproduct of these two keys. The coproduct may be obtained as $SK=SK_1 \oplus SK_2$.

In a further embodiment of the disclosure, once device 105 has computed its coproduct $SK_{105}$ and once device 110 has computed its own coproduct $SK_{110}$, these two devices may then perform a series of steps to confirm that their respectively generated escrow session key $SK_1$ and private session key $SK_2$ are similar. In an embodiment of the disclosure, this may be achieved by encrypting a preagreed challenge phrase using device 105's coproduct $SK_{105}$. This encrypted challenge phrase is then sent to device 110. Device 110 will then decrypt the encrypted challenge phrase using its own coproduct $SK_{110}$. If the decrypted challenge phrase matches the challenge phrase stored in device 110, this implies that both coproducts are similar. In yet another embodiment of the disclosure, device 105's coproduct $SK_{105}$ may be used with a MAC algorithm to produce a MAC data tag. This data tag may then be sent to device 110 who will then in turn use its coproduct $SK_{110}$ to verify the data tag. If the data tag is verified, this then implies that both coproducts are similar. In still yet another embodiment of the disclosure, device 105's coproduct $SK_{105}$ may be used to generate a hash of a preagreed verification value. This hash is then forwarded to device 110. Device 110 then uses its own coproduct $SK_{110}$ to generate a hash of the preagreed verification value. If the two hash values match, this then implies that the coproducts of both devices are similar.

Hence, as server 120 was the trusted source that generated the private IBE key for device 105, server 120 would be able to decrypt the encrypted first element θ thereby allowing server 120 to compute the escrow session key $SK_1$ on its own. However, as server 120 is unaware of the random number "a" generated by device 105 and the random number "b" generated by device 110, server 120 is unable to compute the private session key $SK_2$ thereby ensuring that all communication secured using this private session key remains private to devices 105 and 110 only.

Embodiment Based on a Device Having an IBC Private Key, IBC-K as a Decryption Key and Another Device Having an IBC Private Key as a Signing Key, IBC-K In a third embodiment of the disclosure, device 110 will initially request and obtain its IBC private key (decryption key) from server 120 and device 105 will request and obtain its IBC private key (signing key) from server 120. The IBC private key $IBC-K_{110}$ associated with device 110 is then stored in device 110's secure memory and the IBC private key (signing key) $IBC-K_{105}$ associated with device 105 is stored in device 105's secure memory. In this embodiment, device 110's IBC private key (decryption key) will be generated by server 120 using device 110's identity and device 105's IBC private key (signing key) $IBC-K_{105}$ will be generated using device 105's identity.

The generation of the escrow and private session keys for devices 105 and 110 in accordance with this embodiment of the disclosure is described with the assistance of the illustration in FIG. 3. In particular, at step 305, device 105 initiates the process by choosing a random number "a". Device 105 then proceeds to compute a first element $g^a$ using the chosen random number "a" where g is a generator of a cyclic multiplicative group G with prime order q. Device 105 will then encrypt the first element $g^a$ using device 110's identity $ID_{110}$. This may be done using an Identity Based Encryption (IBE) function associated with the IBC scheme and this may be represented as $\theta = Enc_{110}(g^a, ID_{105})$. The encrypted first element θ is then subsequently signed using device 105's IBC private key (signing key) $IBC-K_{105}$ and this may be represented as $\alpha = Sign_{IBS-K105}(\theta, ID_{110})$. This signing step may be done using an Identity Based Signature (IBS) signing function associated with the IBC scheme. Device 105's identity $ID_{105}$, the signed encrypted first element α and a session key request are then transmitted at step 310 from device 105 to device 110.

Upon receiving the data transmitted from device 105 at step 315, device 110 then proceeds to verify the signed encrypted first element α as received from device 105. This is done by using a standard IBC signature verification function to verify a using device 105's identity $ID_{105}$. If α is successfully verified by device 110, device 110 will proceed to decrypt the encrypted first element θ else, device 110 will abort the entire session key generation process.

Once verified, device 110 then proceeds to decrypt the encrypted first element θ. This decryption step may be done using a decryption function associated with the IBC encryption scheme whereby device 110's IBC private key, $IBC-K_{110}$ is used to decrypt encrypted first element θ that was previously encrypted using device 110's identity $ID_{110}$ with an IBC encryption scheme. Once the encrypted first element θ has been decrypted, device 110 will now be in possession of the first element $g^a$.

Device 110 then proceeds to choose a random number "b". Device 110 then proceeds to compute a second element $g^b$ using the chosen random number "b" where g is a generator of a cyclic multiplicative group G with prime order q. The second element $g^b$ and the identity of device 110, $ID_{110}$ are then transmitted at step 320 from device 110 to device 105.

At step 325, after the data has been transmitted to device 105 from device 110, device 110 then proceeds to compute the escrow session key $SK_1$ using only the first element $g^a$. The computation of the escrow session key $SK_1$ above may be done using existing key generation functions and the first element. Separately, the private session key $SK_2$ is then computed using a function of the first element $g^a$ and random number "b", i.e. $g^{ab}$ whereby random number "b" is known only to device 110.

Once device 105 has received the data transmitted from device 110 at step 320, at step 335, device 105 will now be in possession of the second element $g^b$. Device 105 then proceeds to compute the escrow session key $SK_1$ using only the first element $g^a$. Similarly, the computation of the escrow session key $SK_1$ above may be done using existing key generation functions and the first element. Separately, the private session key $SK_2$ is then computed using a function of the first element $g^b$ and random number "a", i.e. $g^{ab}$ whereby random number "a" is known only to device 105.

As per the previous embodiments, one skilled in the art will recognize that steps 325 and 335 may take place simultaneously or in other embodiments of the disclosure, step 325 may take place before the data is transmitted at step 320 to device 105.

Once devices 105 and 110 have generated their respective escrow session keys $SK_1$ and private session keys $SK_2$, the validity of these two keys may be verified by obtaining a coproduct of these two keys. The coproduct may be obtained as $SK=SK_1 \oplus SK_2$.

In a further embodiment of the disclosure, once device 105 has computed its coproduct $SK_{105}$ and once device 110 has computed its own coproduct $SK_{110}$, these two devices may then perform a series of steps to confirm that their respectively generated escrow session key $SK_1$ and private session key $SK_2$ are similar. In an embodiment of the disclosure, this may be achieved by encrypting a preagreed challenge phrase using device 105's coproduct $SK_{105}$. This encrypted challenge phrase is then sent to device 110. Device 110 will then decrypt the encrypted challenge phrase using its own coproduct $SK_{110}$. If the decrypted challenge phrase matches the challenge phrase stored in device 110, this implies that both coproducts are similar. In this embodiment, the encrypted challenge phrase represents the key confirmation value that is exchanged between both devices. In yet another embodiment of the disclosure, device 105's coproduct $SK_{105}$ may be used with a MAC algorithm to produce a MAC data tag. This data tag may then be sent to device 110 who will then in turn use its coproduct $SK_{110}$ to verify the data tag. If the data tag is verified, this then implies that both coproducts are similar. In this embodiment, the data tag represents the key confirmation value that is exchanged between both devices. In still yet another embodiment of the disclosure, device 105's coproduct $SK_{105}$ may be used to generate a hash of a preagreed verification value. This hash is then forwarded to device 110. Device 110 then uses its own coproduct $SK_{110}$ to generate a hash of the preagreed verification value. If the two hash values match, this then implies that the coproducts of both devices are similar. In this embodiment, the hash value represents the key confirmation value that is exchanged between both devices. It should be noted that other types of key confirmation values may be utilized without departing from this disclosure.

One skilled in the art will recognize that the objective of the steps described in the paragraph above is to generate a key confirmation value that is then used to verify the escrow session key $SK_1$ and the private session key $SK_2$ that has been generated by both devices. One skilled in the art will also recognize that the initiator of the key confirmation steps above may be device 110 and is not limited to device 105 as set out above and that this applies to all embodiments of the disclosure.

Hence, as server 120 was the trusted source that generated the private IBE key for device 105, server 120 would be able to decrypt the encrypted first element θ thereby allowing server 120 to compute the escrow session key $SK_1$ on its own. However, as server 120 is unaware of the random number "a" generated by device 105 and the random number "b" generated by device 110, server 120 is unable to compute the private session key $SK_2$ thereby ensuring that all communication secured using this private session key remains private to devices 105 and 110 only.

In accordance with an embodiment of the disclosure, a method for a device "i" and a device "j" to generate an escrow session key $SK_1$ and a private session key $SK_2$ for encoding digital communications between these two devices, comprises the following steps:

Step 1, generate, using a secure server, a master secret key (MSK) and global system parameters (GSP) for an Identity Based Cryptography (IBC) scheme, whereby the MSK and GSP are utilized together with a requesting device's identity to generate an IBC private key IBC-K for the requesting device;

Step 2, using the first device, use an Identity Based Encryption (IBE) scheme associated with the IBC scheme to encrypt a first element $g^a$ with an identity $ID_j$, associated with the second device j, where g is a generator of a cyclic multiplicative group G and a is a random number generated by the first device i;

Step 3, communicate to the second device, the encrypted first element, an identity $ID_i$ associated with the first device and a session key request such that upon receiving the communication, the second device is configured to:

use the IBE scheme to decrypt the encrypted first element with an IBC private key, $IBC-K_j$, whereby the IBC private key, $IBC-K_j$, is requested and obtained from the secure server;

generate a second element $g^b$ where g is the generator of the cyclic multiplicative group G and b is a random number generated by the second device j;

compute the escrow session key $SK_1$, using the first element;

compute the private session key $SK_2$, using the first element and the random number b; and communicate the second element and an identity $ID_j$ associated with the second device to the first device, Step 4, compute the escrow session key $SK_1$, using the first element and compute the private session key $SK_2$, using the second element and the random number a In order to provide such a system or method, a process is needed for a device "i" and a device "j" to generate an escrow session key $SK_1$ and a private session key $SK_2$ for encoding digital communications between these two devices. The following description and FIG. 4 describe embodiments of processes that provide processes in accordance with this disclosure.

Figure 4:
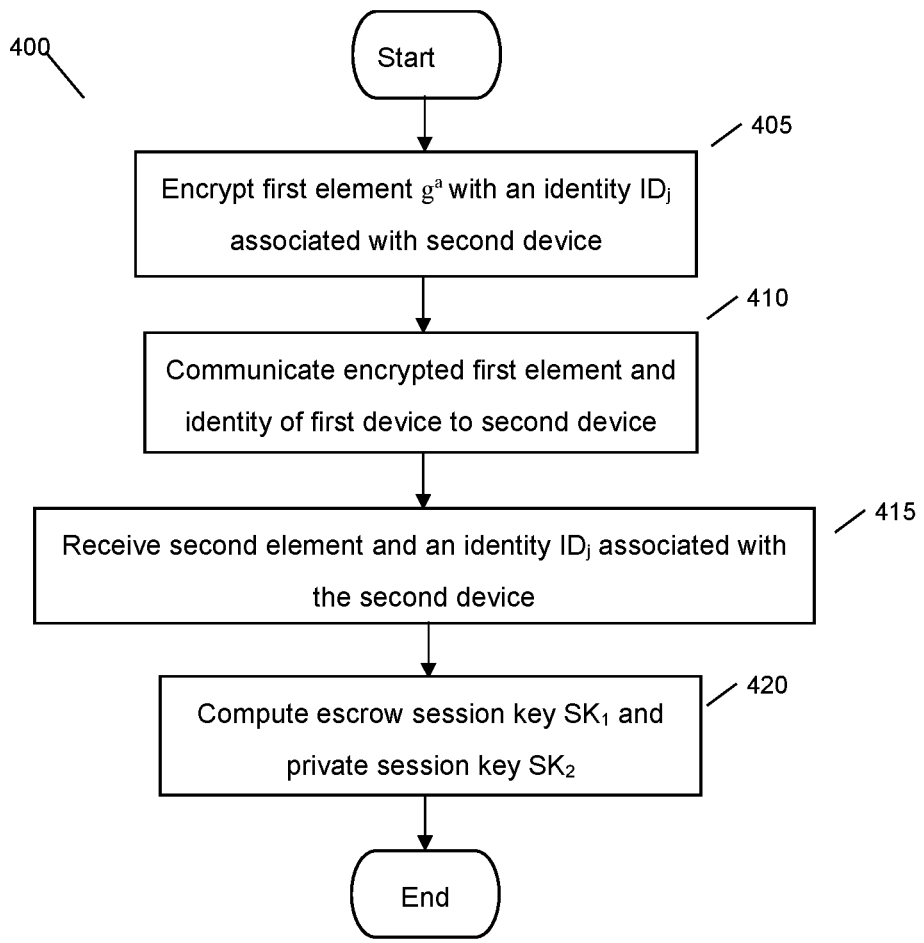
FIG. 4 illustrating a flow diagram of a process for generating an escrow session key and a private session key for encoding digital communications between two devices in accordance with embodiments of the disclosure.

FIG. 4 illustrates process 400 that is performed by a first device "i" to generate an escrow session key $SK_1$ and a private session key $SK_2$ for encoding digital communications between the first device "i" and a second device "j".

Process 400 begins at step 405 with process 400 encrypting first element $g^a$ with identity $ID_j$ that is associated with the second device. The encrypted first element and the identity of the first device $ID_i$ are then transmitted to the second device at step 410.

At step 415, the first device then receives a second element $g^b$ and an identity $ID_j$ associated with the second device. The first device then proceeds to compute the escrow session key $SK_1$ and the private session key $SK_2$ using the received second element $g^b$.

The above is a description of embodiments of a system and process in accordance with the present disclosure as set forth in the following claims. It is envisioned that others may and will design alternatives that fall within the scope of the following claims.

What is claimed is:

1. A system for generating an escrow session key $SK_1$ and a private session key $SK_2$ for encoding digital communications, the system comprising:
   a secure server;
   a device i; and
   another device j;
   wherein the secure server is configured to generate a master secret key (MSK) and global system parameters (GSP) for an Identity Based Cryptography (IBC) scheme, wherein the MSK and GSP are utilized together with an identity of a requesting device to generate an IBC private key IBC-K for the requesting device;
   wherein the device i is configured to:
   encrypt a first element $g^a$ with an identity $ID_j$ associated with the another device j using an Identity Based Encryption (IBE) scheme associated with the IBC scheme to generate an encrypted first element $g^a$, wherein "g" is a generator of a cyclic multiplicative group G and "a" is a random number generated by the device i; and
   communicate, to the another device j, a communication comprising the encrypted first element $g^a$, an identity $ID_i$ associated with the device i, and a session key request;
   wherein upon receiving the communication from the device i, the another device j is configured to:
   use the IBE scheme to decrypt the encrypted first element $g^a$ with an IBC private key IBC-$K_j$, wherein the IBC private key IBC-$K_j$ is requested and obtained by the another device j from the secure server; and
   generate a second element $g^b$, wherein "g" is the generator of the cyclic multiplicative group G and "b" is a random number generated by the another device j;
   compute the escrow session key $SK_1$ using the first element $g^a$;
   compute the private session key $SK_2$ using the first element $g^a$ and the random number b; and
   communicate the second element $g^b$ and the identity $ID_j$ associated with the another device j to the device i;
   wherein the device i is further configured to:
   compute the escrow session key $SK_1$ using the first element;
   compute the private session key $SK_2$ using the second element $g^b$ and the random number a;
   compute a first combined key $SK_{11}$ by obtaining a coproduct of the escrow session key $SK_1$ and the private session key $SK_2$;
   generate a key confirmation value using the first combined key $SK_{11}$; and
   communicate the key confirmation value to the another device j; and
   wherein upon receiving the key confirmation value from the device i, the another device j is configured to:
   compute a second combined key $SK_{22}$ by obtaining a coproduct of the escrow session key $SK_1$ and the private session key $SK_2$;
   verify the key confirmation value using the second combined key $SK_{22}$; and
   validate the escrow session key $SK_1$ and the private session key $SK_2$ in response to the key confirmation value being is verified.

2. The system according to claim 1, wherein the another device j being configured to communicate the second element $g^b$ and the identity $ID_j$ associated with the another device j to the device i comprises:
   using the IBE scheme to encrypt the second element $g^b$ with an identity $ID_i$ associated with the device i to generate an encrypted second element $g^b$; and
   communicating the encrypted second element $g^b$ and the identity $ID_j$ associated with the another device j to the device i;
   wherein upon receiving the encrypted second element $g^b$ and the identity $ID_j$ associated with the another device j from the another device j, the device i is configured to:
   use the IBE scheme to decrypt the encrypted second element $g^b$ with an IBC private key IBC-$K_i$, wherein the IBC private key IBC-$K_i$ is requested and obtained by the device i from the secure server.

3. The system according to claim 1,
   wherein computing the escrow session key $SK_1$ by the another device j comprises: using the first element $g^a$ and the second element $g^b$ to generate the escrow session key $SK_1$; and
   wherein computing the escrow session key $SK_1$ by the device i comprises: using the first element $g^a$ and the second element $g^b$ to generate the escrow session key $SK_1$.

4. The system according to claim 1, wherein the another device j communicating the second element $g^b$ and the identity ID associated with the another device j to the device i comprises:
   using a Public Key Infrastructure (PKI) scheme to encrypt the second element $g^b$ with a PKI Public Key $PBK_i$ associated with the device i to generate an encrypted second element $g^b$; and
   communicating the encrypted second element $g^b$ and the identity $ID_j$ associated with the another device j to the device i;
   wherein upon receiving the encrypted second element $g^b$ and the identity $ID_j$ associated with the another device j, the device i is configured to:
   use the PKI scheme to decrypt the encrypted second element $g^b$ with a PKI Private Key $PRK_i$ associated with the device i.

5. The system according to claim 1, wherein communicating by the device i the encrypted first element $g^a$, the identity $ID_i$ associated with the device i, and the session key request to the another device j comprises:
   signing the encrypted first element $g^a$ using an IBC private signing key IBC-$K_i$ associated with the device i to generate a signed encrypted first element $g^a$; and
   transmitting the signed encrypted first element $g^a$ to the another device j;
   wherein upon receiving the signed encrypted first element $g^a$, the another device j is configured to:
   verify the signed encrypted first element $g^a$ using the identity $ID_i$ associated with the device i and a verification function associated with the IBC scheme, wherein the first element $g^a$ is decrypted in response to the signed encrypted first element $g^a$ being verified.

6. A device i for generating an escrow session key $SK_1$ and a private session key $SK_2$ for encoding digital communications between the device i and another device j, comprising:
   a processor; and
   a non-transitory media readable by the processor, the non-transitory media storing instructions that when executed by the processor, cause the processor to:
   use an Identity Based Encryption (IBE) scheme associated with an Identity Based Cryptography (IBC) scheme to encrypt a first element $g^a$ with an identity $ID_j$ associated with the another device j to generate an encrypted first element $g^a$, wherein "g" is a generator of a cyclic multiplicative group G and "a" is a random number generated by the device i, wherein the IBC scheme comprises a master secret key (MSK) and global system parameters (GSP), and wherein the MSK and GSP are utilized together with an identity of a requesting device to generate an IBC private key IBC-K for the requesting device;

communicate, to the another device j, the encrypted first element $g^a$, an identity $ID_i$ associated with the device i, and a session key request;

receive, from the another device j, a second element $g^b$ and the identity $ID_j$ associated with the another device j;

compute the escrow session key $SK_1$ using the first element $g^a$;

compute the private session key $SK_2$ using the second element $g^b$ and the random number a, wherein "g" is the generator of the cyclic multiplicative group G and "b" is a random number generated by the another device j;

compute a first combined key $SK_{11}$ by obtaining a coproduct of the escrow session key $SK_1$ and the private session key $SK_2$;

generate a key confirmation value using the first combined key $SK_{11}$, wherein the key confirmation value is communicated to the another device j; and validate the key confirmation value in response to a key confirmation validation value associated with the another device j being received.

7. The device according to claim 6, wherein the second element $g^b$ is encrypted using the IBE scheme and the identity $ID_i$ associated with the device i to generate an encrypted second element $g^b$, wherein the device i uses the IBE scheme to decrypt the encrypted second element $g^b$ with an IBC private key IBC-$K_i$, wherein the IBC private key IBC-$K_i$ is requested and generated in accordance with the IBC scheme.

8. The device according to claim 6, wherein computing the escrow session key $SK_1$ by the device i comprises the device i being configured to use the first element $g^a$ and the second element $g^b$ to generate the escrow session key $SK_1$.

9. The device according to claim 6, wherein the second element $g^b$ is encrypted using a Public Key Infrastructure (PKI) scheme with a PKI Public Key $PBK_i$ associated with the device i to generate an encrypted second element $g^b$, wherein the device i uses the PKI scheme to decrypt the encrypted second element $g^b$ with the PKI Private Key $PRK_i$ associated with the device i.

10. The device according to claim 6, wherein communicating the encrypted first element $g^a$, the identity $ID_i$ associated with the device i, and the session key request to the another device j comprises:

signing the encrypted first element $g^a$ using an IBC private signing key IBC-$K_i$ associated with the device i to generate a signed encrypted first element $g^a$; and transmitting the signed encrypted first element $g^a$ to the another device j.

11. A method for generating an escrow session key $SK_1$ and a private session key $SK_2$ for encoding digital communications between a device i and another device j, comprising:

encrypting, by the device i, a first element $g^a$ with an identity $ID_j$ associated with the another device j using an Identity Based Encryption (IBE) scheme associated with an Identity Based Cryptography (IBC) scheme to generate an encrypted first element $g^a$, wherein "g" is a generator of a cyclic multiplicative group G and "a" is a random number generated by the device i, wherein the IBC scheme comprises a master secret key (MSK) and global system parameters (GSP), and wherein the MSK and GSP are utilized together with an identity of a requesting device to generate an IBC private key IBC-K for the requesting device;

communicating, by the device i to the another device j, the encrypted first element $g^a$, an identity $ID_i$ associated with the device i, and a session key request;

receiving, by the device i from the another device j, a second element $g^b$ and the identity IDj associated with the another device j;

computing, by the device i, the escrow session key $SK_1$ using the first element $g^a$;

computing, by the device i, the private session key $SK_2$ using the second element $g^b$ and the random number a;

computing, by the device i, a first combined key $SK_{11}$ by obtaining a coproduct of the escrow session key $SK_1$ and the private session key $SK_2$;

generating, by the device i, a key confirmation value using the first combined key $SK_{11}$, wherein the key confirmation value is communicated to the another device j; and validating, by the device i, the key confirmation value in response to a key confirmation validation value associated with the another device j being received.

12. The method according to claim 11, wherein the second element $g^b$ is encrypted using the IBE scheme and the identity $ID_i$ associated with the device i to generate an encrypted second element $g^b$, wherein the device i uses the IBE scheme to decrypt the encrypted second element $g^b$ with an IBC private key IBC-$K_i$, wherein the IBC private key IBC-$K_i$ is requested and generated in accordance with the IBC scheme.

13. The method according to claim 11, wherein computing the escrow session key $SK_1$ by the device i comprises the device i being configured to use the first element $g^a$ and the second element $g^b$ to generate the escrow session key $SK_1$.

14. The method according to claim 11, wherein the second element $g^b$ is encrypted using a Public Key Infrastructure (PKI) scheme with a PKI Public Key $PBK_i$ associated with the device i to generate an encrypted second element $g^b$, wherein the device i uses the PKI scheme to decrypt the encrypted second element $g^b$ with the PKI Private Key $PRK_i$ associated with the device i.

15. The method according to claim 11, wherein communicating the encrypted first element $g^a$, the identity $ID_i$ associated with the device i, and the session key request to the another device j comprises:

signing, by the device i, the encrypted first element $g^a$ using an IBC private signing key IBC-$K_i$ associated with the device i to generate a signed encrypted first element $g^a$; and transmitting, by the device i, the signed encrypted first element $g^a$ to the another device j.

\* \* \* \* \*

UNITED STATES PATENT AND TRADEMARK OFFICE
CERTIFICATE OF CORRECTION

PATENT NO. : 11,265,161 B2
APPLICATION NO. : 16/988347
DATED : March 1, 2022
INVENTOR(S) : Yasmin et al.

It is certified that error appears in the above-identified patent and that said Letters Patent is hereby corrected as shown below:

In the Claims

Claim 4: Column 20, Line 25: "identity ID associated with the another device $j$ to the device" should read -- identity $ID_j$ associated with the another device $j$ to the device --.

Signed and Sealed this
Nineteenth Day of July, 2022

Katherine Kelly Vidal
*Director of the United States Patent and Trademark Office*